US008888591B2

(12) United States Patent
dos Santos et al.

(10) Patent No.: US 8,888,591 B2
(45) Date of Patent: Nov. 18, 2014

(54) PROJECTED REELS WITH SPINNING MECHANISM

(71) Applicant: WMS Gaming Inc., Waukegan, IL (US)

(72) Inventors: Raphael dos Santos, Barcelona (ES); Bruce H. Blair, Oak Park, IL (US); Timothy C. Loose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/795,364

(22) Filed: Mar. 12, 2013

(65) Prior Publication Data

US 2014/0073403 A1 Mar. 13, 2014

Related U.S. Application Data

(60) Provisional application No. 61/699,073, filed on Sep. 10, 2012.

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3213* (2013.01); *G07F 17/3288* (2013.01)

USPC .................... 463/31; 463/16; 463/20; 463/30

(58) Field of Classification Search

USPC ............. 463/16–20, 29–31, 46, 1, 25, 40–43; 273/138.1, 139

See application file for complete search history.

(56) References Cited

U.S. PATENT DOCUMENTS

| | | | | |
|---|---|---|---|---|
| 7,311,607 | B2 | 12/2007 | Tedsen et al. | 463/32 |
| 7,341,520 | B2 | 3/2008 | Mattice et al. | 463/31 |
| 7,452,276 | B2 | 11/2008 | Loose et al. | 463/31 |
| 7,654,899 | B2 | 2/2010 | Durham et al. | 463/30 |
| 7,841,944 | B2 | 11/2010 | Wells | 463/37 |
| 7,951,001 | B2 | 5/2011 | Wells | 463/33 |
| 8,012,021 | B2 | 9/2011 | Crowder, Jr. et al. | 463/34 |
| 8,096,878 | B2 | 1/2012 | Durham et al. | 463/31 |
| 8,115,700 | B2 | 2/2012 | Schlottmann et al. | 345/4 |
| 8,128,477 | B2 | 3/2012 | Durham et al. | 463/17 |
| 8,137,185 | B2 | 3/2012 | Crowder, Jr. et al. | 463/20 |
| 8,142,273 | B2 | 3/2012 | Williams et al. | 463/20 |
| 8,241,124 | B2 * | 8/2012 | Kelly et al. | 463/34 |
| 8,251,795 | B2 * | 8/2012 | Durham et al. | 463/20 |
| 8,562,151 | B2 * | 10/2013 | Lin | 353/94 |
| 2002/0065126 | A1 * | 5/2002 | Miller et al. | 463/20 |
| 2003/0107530 | A1 * | 6/2003 | Motegi et al. | 345/6 |
| 2003/0176214 | A1 * | 9/2003 | Burak et al. | 463/20 |
| 2003/0195035 | A1 * | 10/2003 | Onuki et al. | 463/20 |
| 2004/0052078 | A1 * | 3/2004 | Hosaka | 362/302 |
| 2005/0037843 | A1 * | 2/2005 | Wells et al. | 463/30 |
| 2006/0166727 | A1 * | 7/2006 | Burak | 463/16 |
| 2007/0010318 | A1 * | 1/2007 | Rigsby et al. | 463/20 |
| 2008/0004104 | A1 * | 1/2008 | Durham et al. | 463/20 |
| 2008/0108422 | A1 * | 5/2008 | Hedrick et al. | 463/22 |

(Continued)

*Primary Examiner* — Milap Shah

(74) *Attorney, Agent, or Firm* — Nixon Peabody LLP

(57) ABSTRACT

A gaming machine is configured for playing a wagering game and includes at least one non-rotating curved surface and a projection apparatus. The projection apparatus includes at least one rotatable element and is configured to project images of symbols onto the curved surface while the at least one rotatable element is rotated and then stopped such that the symbols appear to respectively move and then stop along the curved surface. The stopped symbols indicate a randomly selected outcome of the wagering game.

20 Claims, 13 Drawing Sheets

(56) References Cited

U.S. PATENT DOCUMENTS

| | | | | |
|---|---|---|---|---|
| 2008/0248852 | A1* | 10/2008 | Rasmussen | 463/16 |
| 2009/0069069 | A1* | 3/2009 | Crowder et al. | 463/20 |
| 2009/0069070 | A1 | 3/2009 | Crowder, Jr. et al. | 463/20 |
| 2009/0149249 | A1* | 6/2009 | Sum | 463/30 |
| 2009/0258701 | A1* | 10/2009 | Crowder et al. | 463/34 |
| 2010/0190552 | A1* | 7/2010 | Rasmussen et al. | 463/34 |
| 2011/0300937 | A1 | 12/2011 | Crowder, Jr. et al. | 463/34 |
| 2012/0040738 | A1* | 2/2012 | Lanning et al. | 463/20 |

* cited by examiner

PROJECTED REELS WITH SPINNING MECHANISM

CROSS-REFERENCE TO RELATED APPLICATIONS

This application claims the benefit of and priority to U.S. Provisional Patent Application No. 61/699,073, titled "Projected Reels With Spinning Mechanism" and filed on Sep. 10, 2012, which is incorporated herein by reference in its respective entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to rotatable elements for displaying rotating symbols in a wagering game.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

Traditionally, gaming machines operate under control of a processor that has been programmed to execute base games and bonus games in which reel arrays spin and stop to display symbol combinations in a display area. If winning combinations are achieved by the symbol combinations, awards are provided to the players.

SUMMARY OF THE INVENTION

According to one aspect of the present invention, a gaming machine is configured for playing a wagering game and includes at least one non-rotating curved surface and a projection apparatus. The projection apparatus includes at least one rotatable element and is configured to project images of symbols onto the curved surface while the at least one rotatable element is rotated and then stopped such that the symbols appear to respectively move and then stop along the curved surface. The stopped symbols indicate a randomly selected outcome of the wagering game.

According to another aspect of the invention, a gaming machine for playing a wagering game includes a cabinet for housing input devices, and at least one non-rotating curved surface for displaying rotating images and non-rotating images of a plurality of symbols. The non-rotating images are indicative of a randomly selected outcome of the wagering game. The gaming machine further includes a projection apparatus having at least one rotatable element for projecting the non-rotating images, the at least one rotatable element being mounted to a rotatable support. The rotating images are achieved by rotational motion of the rotatable support.

According to yet another aspect of the invention, a gaming system is configured to conduct a wagering game and includes one or more input devices and one or more display devices. At least one of the one or more display devices includes at least one non-rotating curved surface. The gaming system further includes one or more processors and one or more memory devices. The memory devices store instructions that, when executed by at least one or more processors, cause the gaming system to receive, via at least one of the one or more input devices, an input indicative of a wager, and randomly select, via at least one of the one or more processors, an outcome from a plurality of outcomes. The gaming system also includes a projection apparatus that has at least one rotatable element, the projection apparatus being configured to project images of symbols onto the curved surface while the at least one rotatable element is rotated and then stopped such that the symbols appear to respectively move and then stop along the curved surface. The stopped symbols indicate the randomly selected outcome of the wagering game.

Additional aspects of the invention will be apparent to those of ordinary skill in the art in view of the detailed description of various embodiments, which is made with reference to the drawings, a brief description of which is provided below.

Figure 1:
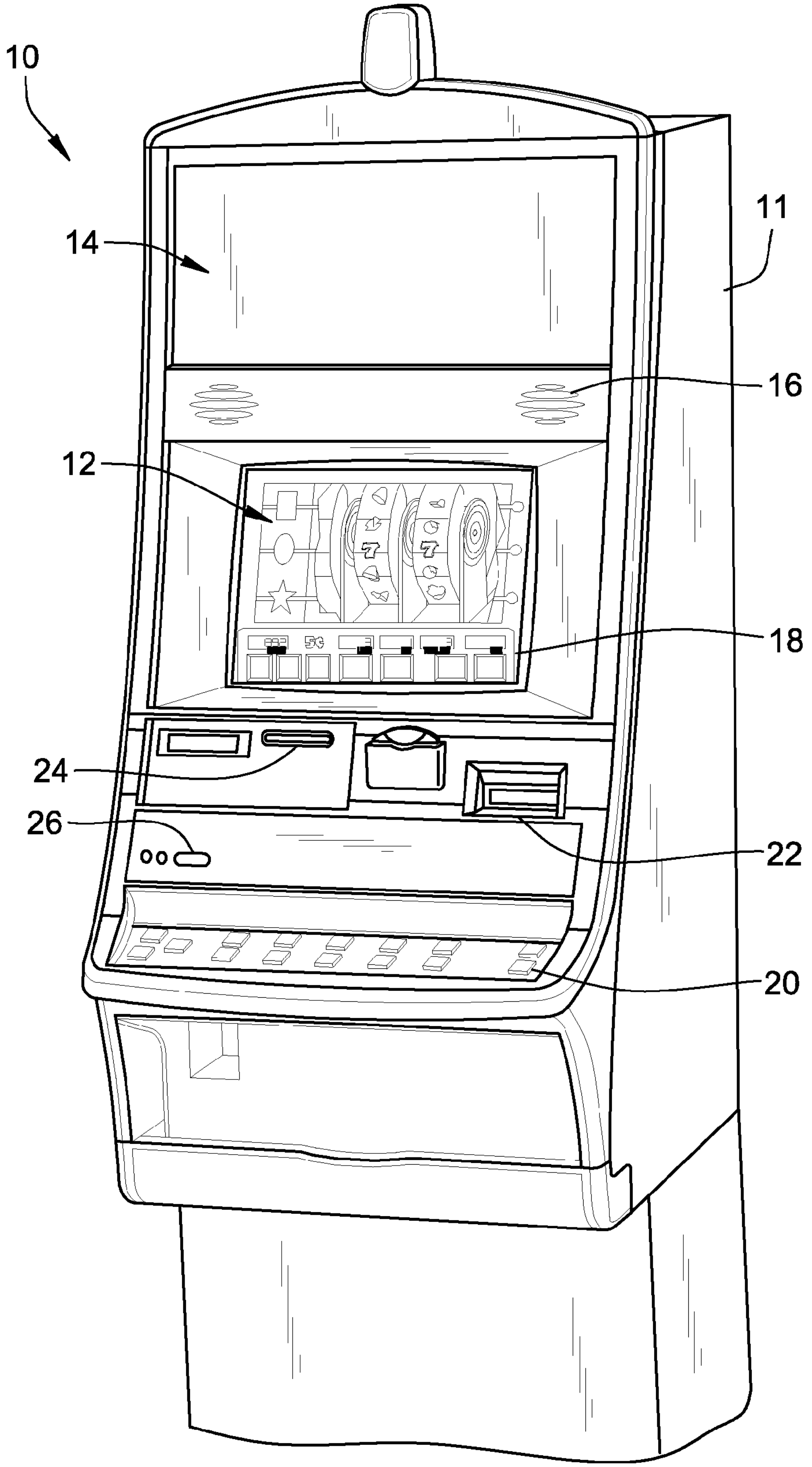
FIG. 1 (PRIOR ART)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a “Max Bet” button or soft key to indicate a player’s desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
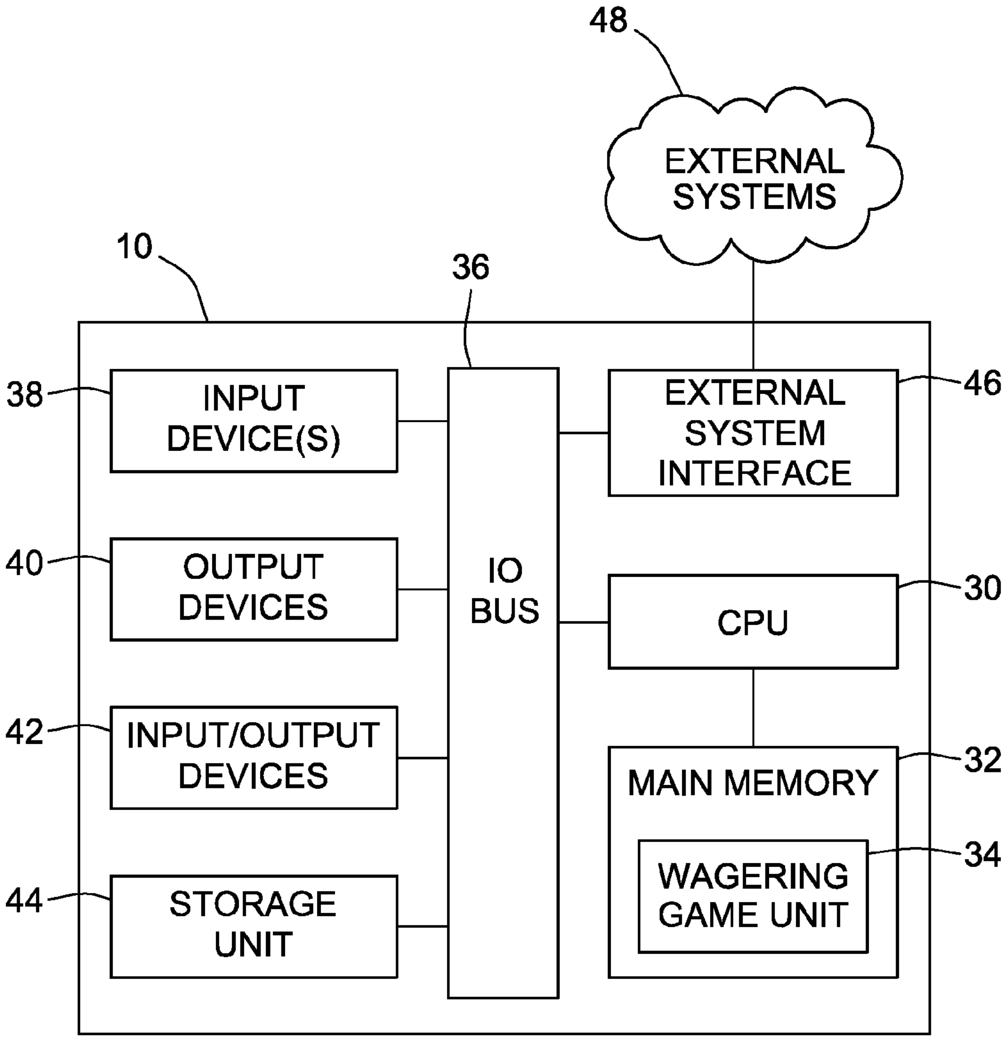
FIG. 2 (PRIOR ART)
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player’s portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
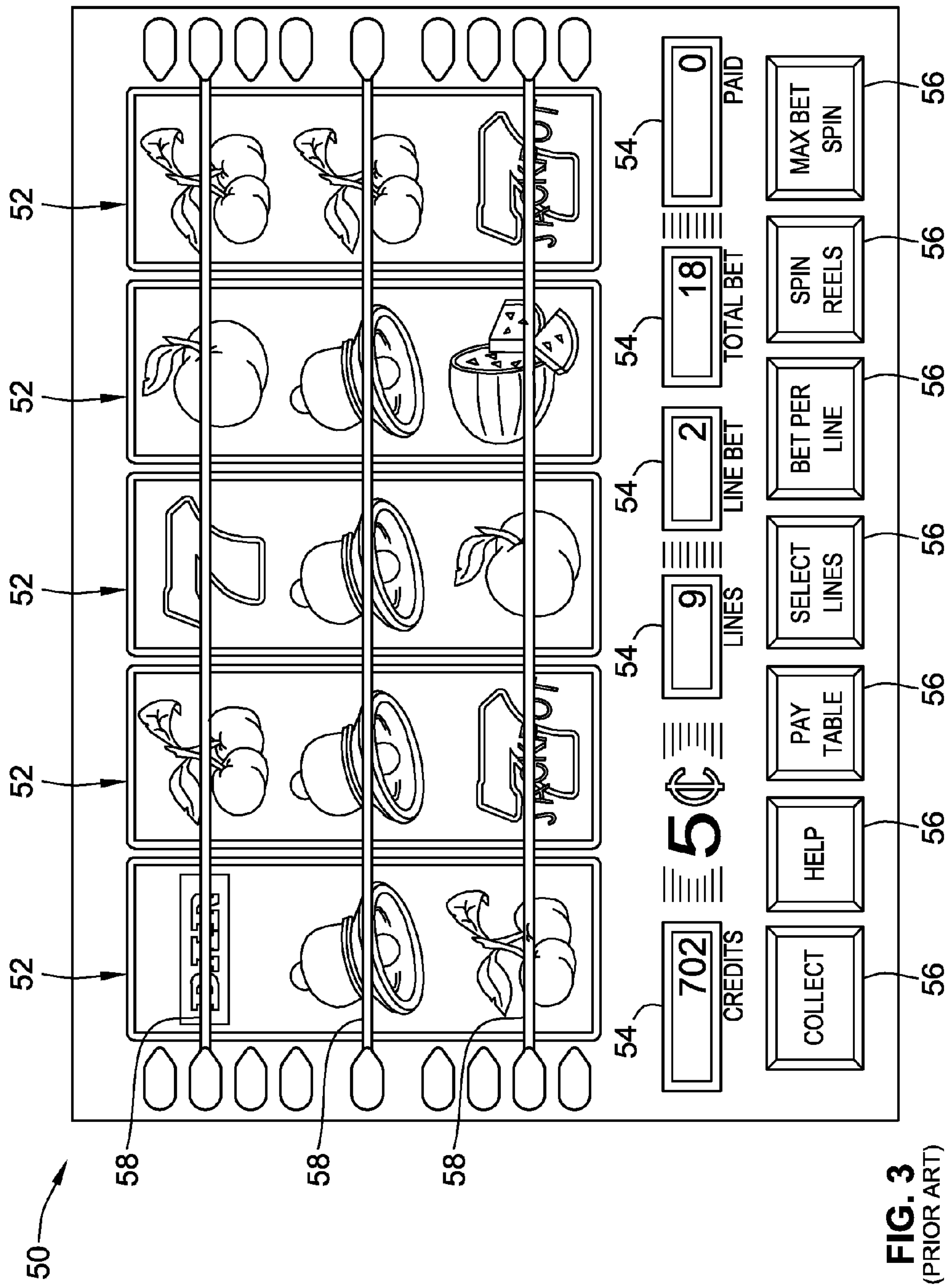
FIG. 3 (PRIOR ART)
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4A:
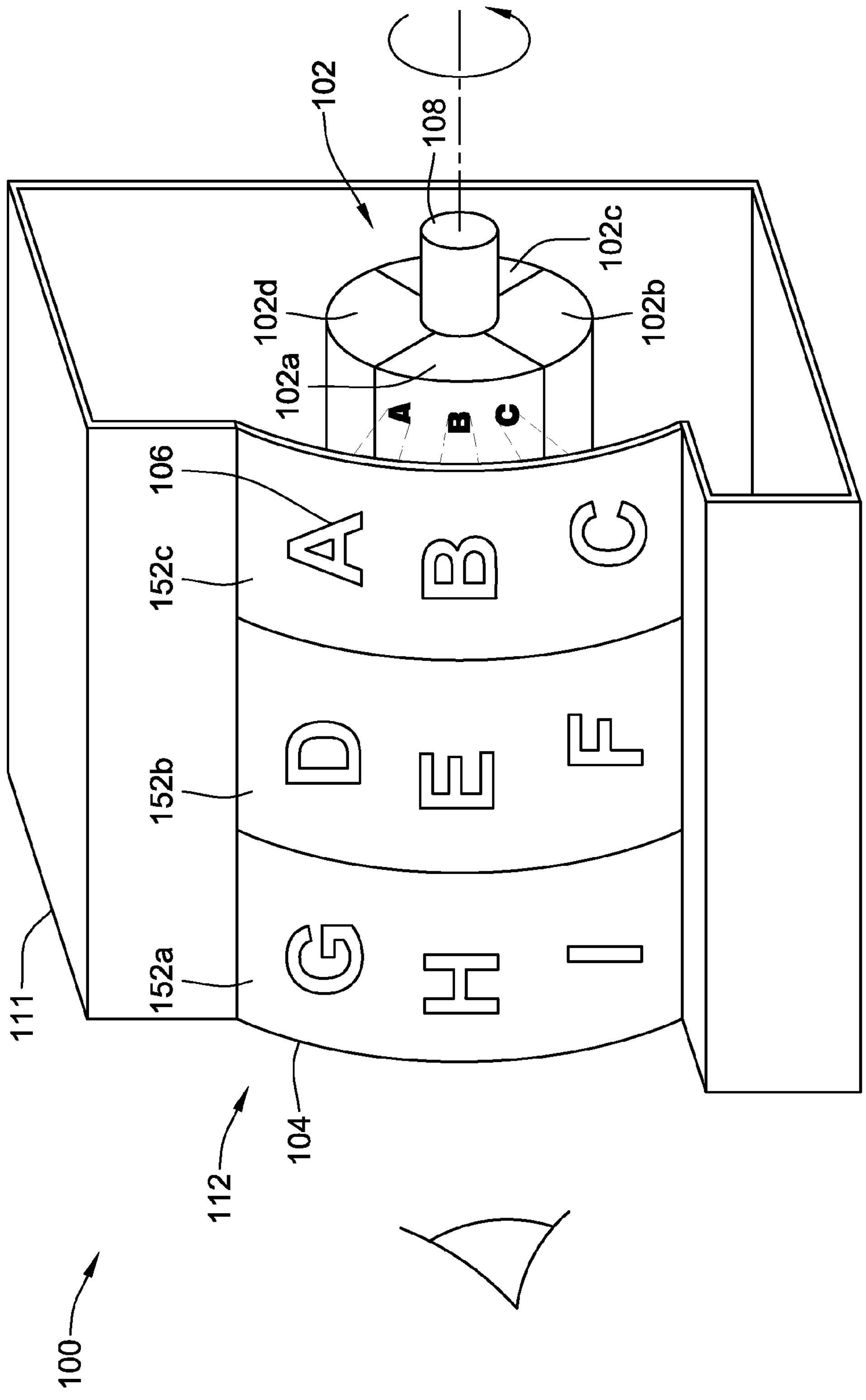
FIG. 4A is an illustrative perspective view of a gaming machine having a spinning projector apparatus and displaying images of symbols in a stopped position.
Figure 4B:
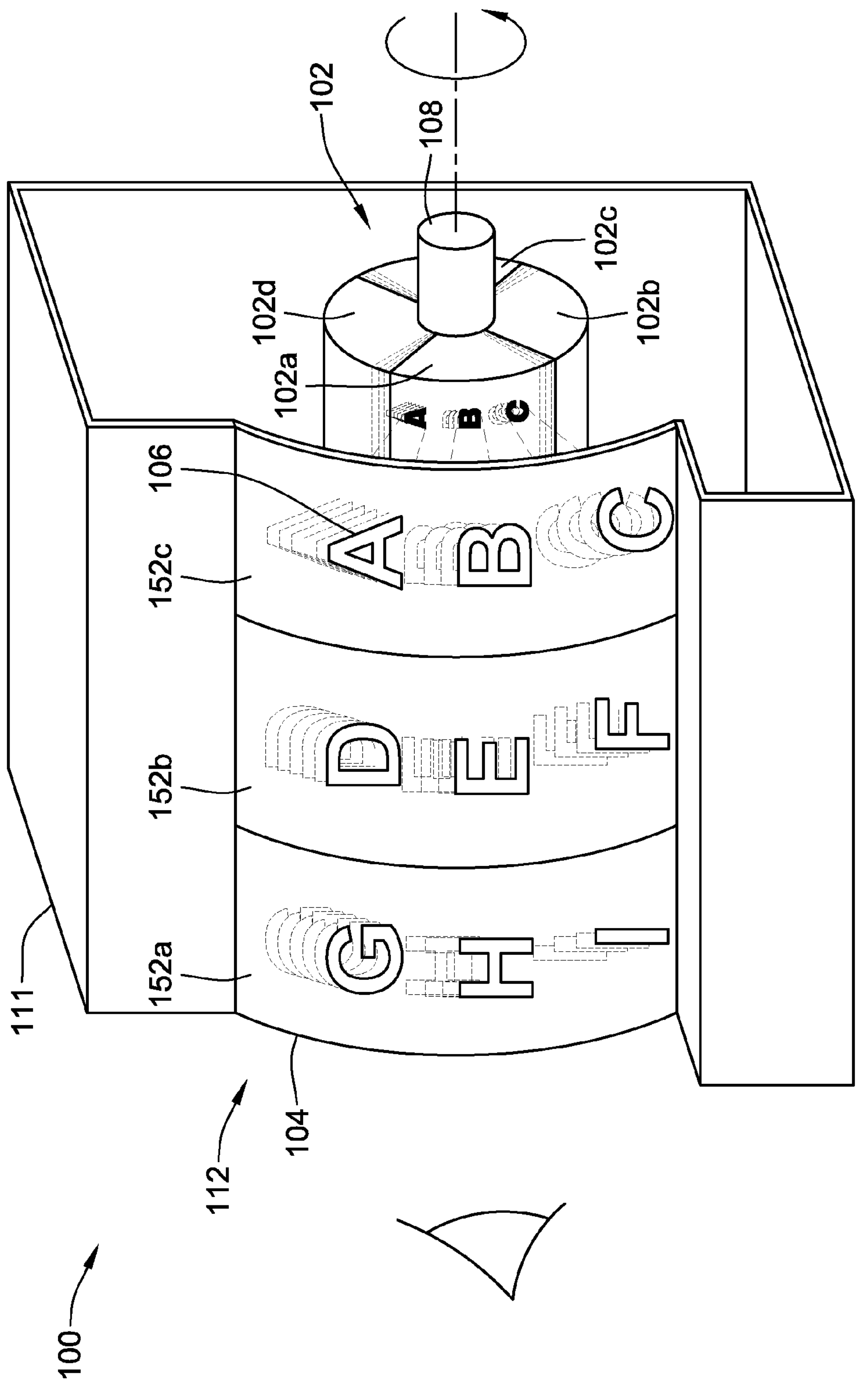
FIG. 4B is an illustrative perspective view of the gaming machine of FIG. 4A displaying the images of symbols in a moving position.
Figure 4C:
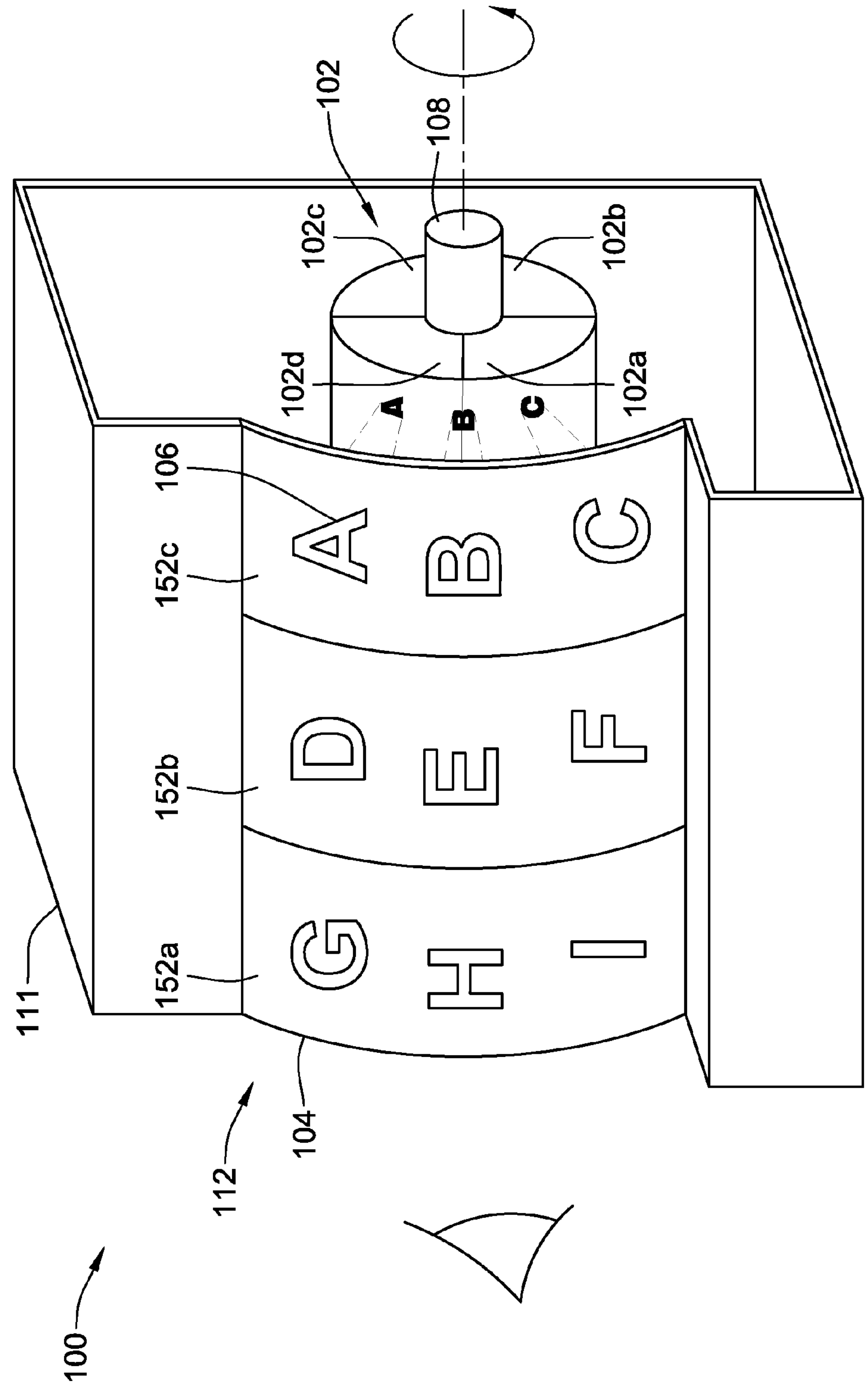
FIG. 4C is an illustrative perspective view of the gaming machine of FIG. 4A displaying the images of symbols in another stopped position.

Referring now to FIGS. 4A-4C, a gaming machine 100 for playing a wagering game includes a projection apparatus 102 having one or more rotatable elements 102*a*-102*d* that are configured to project images of symbols 106 onto a curved surface 104. The curved surface 104 is non-rotating and is part of a display area 112 facing a player area in front of the gaming machine 100. The symbols 106 are displayed on the curved surface 104 in the form of a plurality of reels 152*a*-152*b* for indicating a randomly selected outcome of the wagering game. To simulate rotational movement of the symbols 106, only the rotatable elements 102*a*-102*d* are physically rotated (or spinned).

The projection apparatus 102 provides numerous benefits in contrast to current mechanical or video gaming machines.

Rotating the projecting apparatus 102 (instead of, for example, rotating the curved surface 104 or rotating traditional mechanical reels) is beneficial in achieving high resolution images that do not flicker, fluid images that simulate smooth spinning of reels 152*a*-152*b*, and/or images that do not require backlighting for the reels 152*a*-152*b*. For example, symbols 106 can run smoothly down the reels 152*a*-152*b* at any rotational speed. The projection apparatus 102 further provides video images that are more realistically resemble mechanical reels than other current video images. The projection apparatus 102 further provides improved contrast (in comparison to using backlit art) and increased options for animation or changing colors of the reels 152*a*-152*b*. For example, when playing a plurality of free spins, the symbols 106 can change for each of the free spins. Additional benefits include using less cabinet space and reducing (if not eliminating) spinning noise. Using less cabinet space is helpful to form the cabinet 111 into a thin-profile cabinet, which, among other advantages, is helpful in maximizing the number of gaming machines available on the floor of a gaming establishment.

According to one example, the gaming machine 100 is generally similar (but not necessarily identical) to the gaming terminal 10 illustrated in FIG. 1. For example, the gaming machine 100 includes a cabinet 111 that may house the projection apparatus 102 and/or various input devices, output devices, and input/output devices. As a further example, the gaming machine 100 may include one or more display areas, similar to the primary and secondary display areas 12, 14 (e.g., the display area 112 is similar to the primary display area 12).

The rotatable elements 102*a*-102*d* rotate while projecting images of the symbols 106 onto the curved surface 104. More specifically, the rotatable elements 102*a*-102*d* are rotated, then stopped, such that the symbols 106 appear to respectively move, then stop, along the curved surface 104. According to some examples, the rotatable elements 102*a*-102*d* are projectors and/or K-mirrors systems (described in more detail below).

The projectors can include light-emitting diode (LED) projectors, mini-laser projectors (such as manufactured by Microvision, Inc. or Explay Ltd), LCD projection devices, and/or DLP projection devices. Other examples can include traditional projection technologies or other systems, such as liquid crystal on silicon (LCoS) technology, heads-up display (HUD), light pipe displays, fiber optic displays, and laser projection displays (e.g., a three-colored laser). The images projected by the rotatable elements 102*a*-102*d*, as the rotatable elements 102*a*-102*d* are being rotated, simulate images rotating on a mechanical reel having a radius of curvature equivalent to the radius of curvature of the curved surface 104. As described above, in certain embodiments the images can be a high-resolution output, such as an 1920×1080 pixel display, or greater, or other suitable resolution that would be considered high-resolution to those familiar with the field of disclosure.

The projection apparatus 102 is mounted to a common rotatable support structure 108 that is located behind the curved surface 104. Although the support structure 108 is illustrated enclosed within the cabinet 111 and behind the curved surface 104, the support structure 108 can be located outside the cabinet 111 and in other positions relative to the curved surface 104. For example, the support structure 108 may be located above the curved surface 104. Furthermore, only some of the rotatable elements 102*a*-102*d* may be mounted to the support structure 108. For example only a first rotatable element 102*a* may be mounted to the support structure 108, while the other three rotatable elements 102*a*-102*d* may be mounted to a different support structure.

Figure 5A:
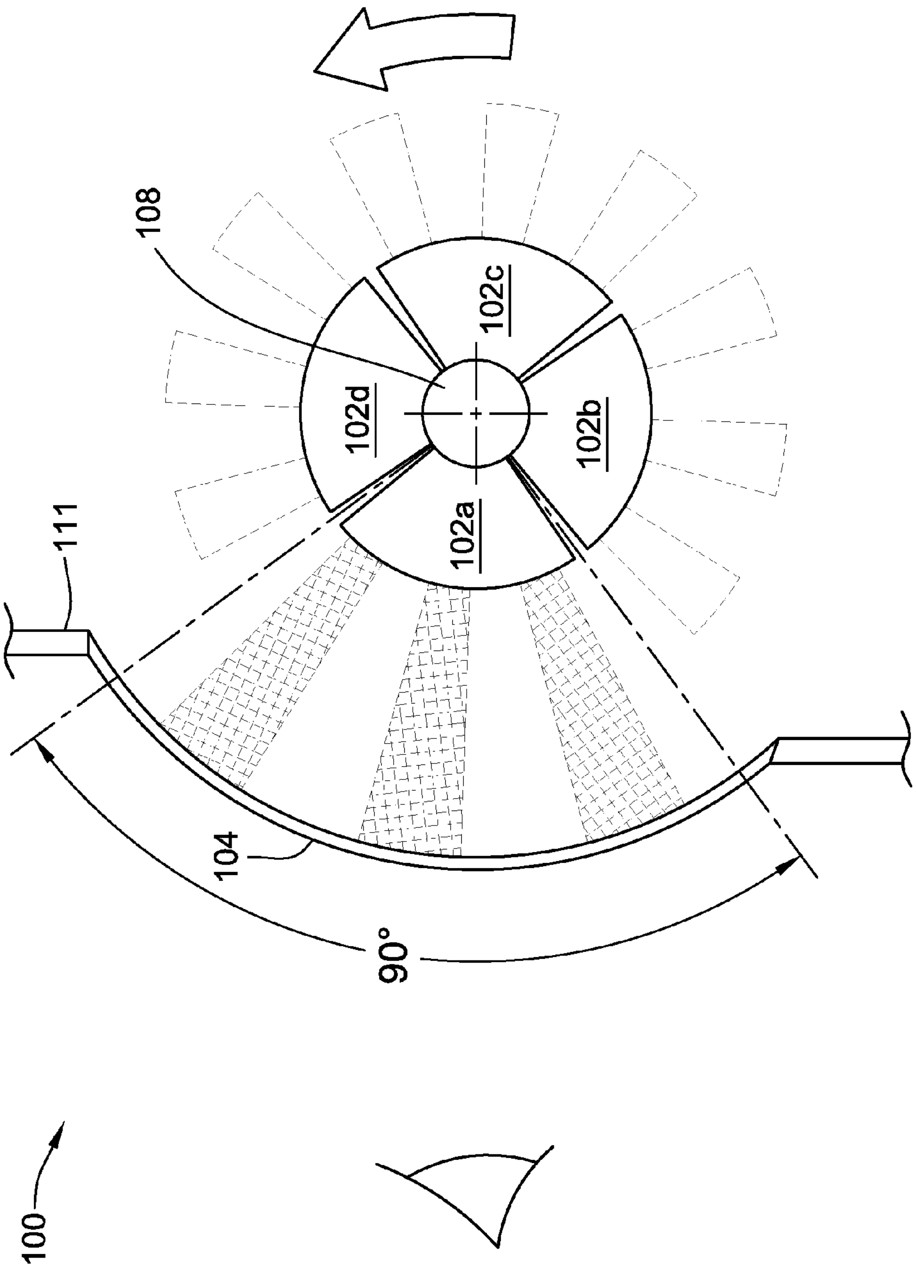
FIG. 5A is an illustrative side view of the gaming machine of FIG. 4A.

Each of the rotatable elements 102*a*-102*d* projects an image that covers a portion of a 360° display field surrounding the support structure 108. For example, the first rotatable element 102*a* projects an image that generally covers approximately 90° of the display field (as illustrated in FIG. 5A). In the illustration of FIG. 4A, in which the reels 152*a*-152*c* are in a first stopped position, the portion of the image covered by the first rotatable element 102*a* is sufficient to project as part of a right reel 152*c* three symbols 106 at one time—symbol "A" in a top position, symbol "B" in a middle position, and symbol "C" in a bottom position. In this example, the full 360° display field includes the projection of 12 symbols, each of the rotatable elements 102*a*-102*d* projecting 3 symbols. In alternative embodiments, any number of rotatable elements can be used to cover the 360° display field.

According to one example, as the rotatable elements 102*a*-102*d* are rotated, each of the rotatable elements 102*a*-102*d* projects a single complete image. However, according to another example, as the rotatable elements 102*a*-102*d* are rotated (FIG. 4B) images from adjacent ones of the rotatable elements 102*a*-102*d* may, optionally, overlap to project a single complete image. For example, in the illustration of FIG. 4C, in which the reels 152*a*-152*c* are stopped in a second stopped position, the first rotatable element 152*a* projects a bottom half of the symbol "B" in the middle position and the symbol "C" in the bottom position. A second rotatable element 152*d*, which is mounted on the support structure 108 adjacent to the first rotatable element 152 in a clockwise direction, projects the symbol "A" in the top position and an upper half of the symbol "B" in the middle position. The projection of the three symbols "A," "B," and "C" is seamless to the player.

Figure 5B:
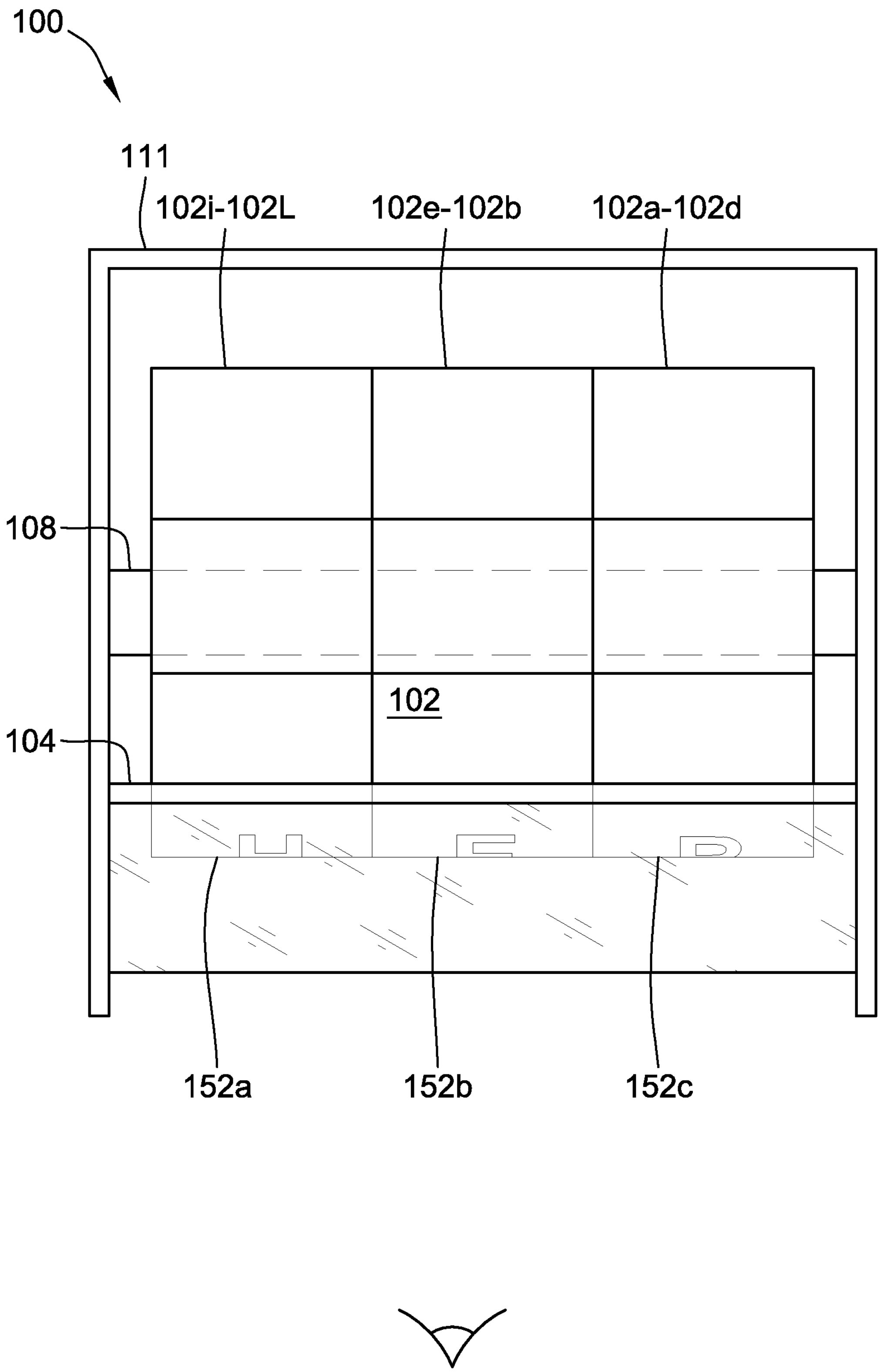
FIG. 5B is an illustrative top view of the gaming machine of FIG. 4A.

Referring to FIGS. 5A and 5B, the projection apparatus 102 includes three sets of rotatable elements 102*a*-102*l*, each set including four rotatable elements. For example, a first set includes rotatable elements 102*a*-102*d* for projecting images associated with the right reel 152*c*, a second set includes rotatable elements 102*e*-102*h* for projecting images associated with a middle reel 152*b*, and a third set includes rotatable elements 102*i*-102*l* for projecting images associated with a left reel 152*a*. According to the illustrated example, all three sets of rotatable elements 102*a*-102*l* are mounted for rotation on the support structure 108. Optionally, one or more sets may be mounted on a different support structure. For example, the second set 102*e*-102*h* and the third set 102*i*-102*l* may be mounted on a separate support structure to achieve a different rotation of images associated with the left and middle reels 152*a*, 152*b* than the rotation of images associated with the right reel 152*c*. Optionally, a single set of rotatable elements can be used to display the images for all the reels 152*a*-152*c*.

Figure 6:
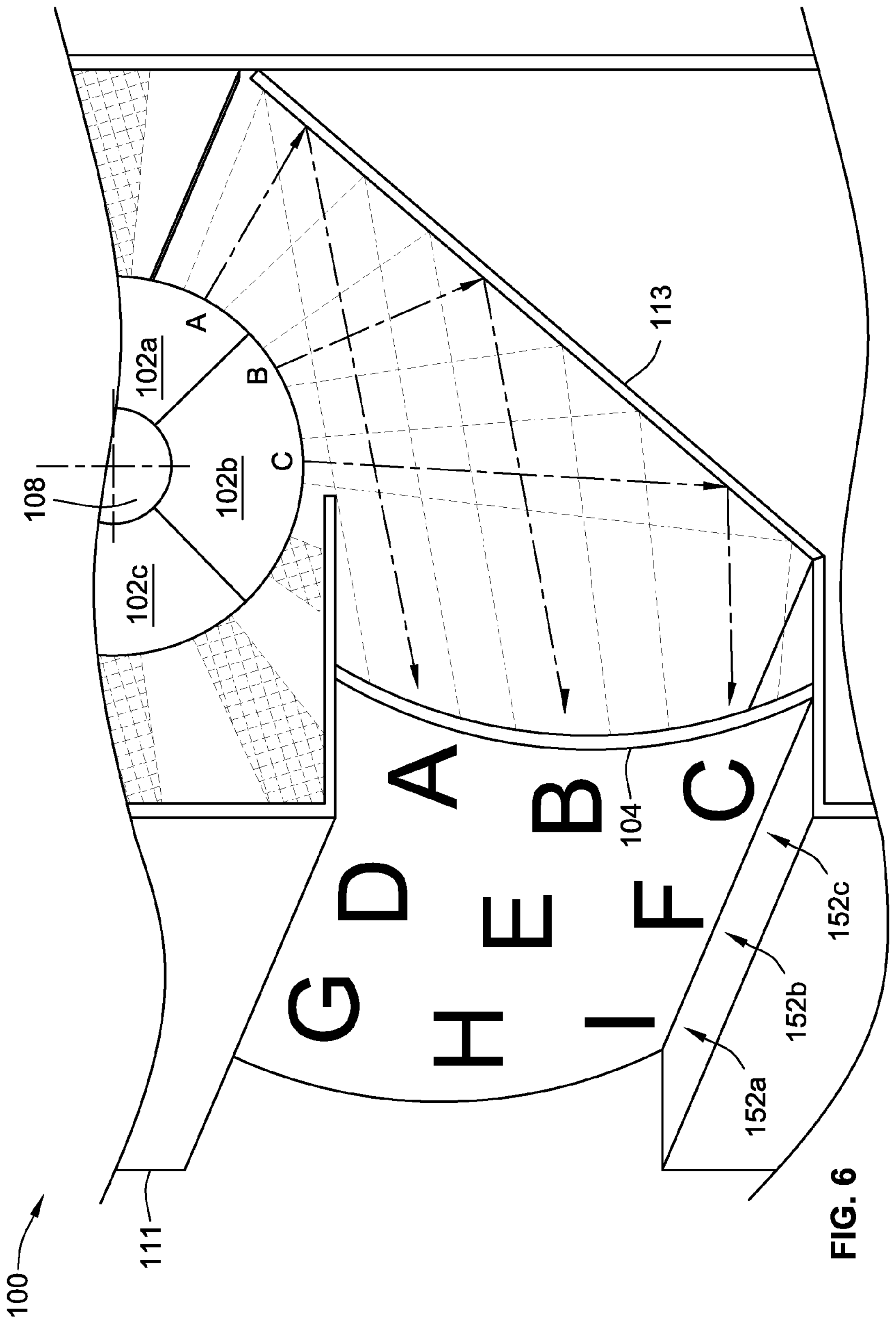
FIG. 6 is an illustrative side view of a top-mounted configuration of a projection apparatus with a mirror reflector.

Referring to FIG. 6, the gaming machine 100 has a top-mounted configuration in which the projection apparatus 102 is mounted generally above the curved surface 104. The top-mounted configuration includes a mirror reflector 113 that is positioned behind the curved surface 104 (similar to how the projection apparatus 102 is illustrated in FIGS. 4A-5B). In this example, the projected images from the projection apparatus 102 are initially received by the mirror reflector 113 and, then, projected to the curved surface 104. Thus, the projection of images from the projection apparatus 102 to the curved surface 104 can be achieved in an indirect manner, e.g., via the mirror reflector 113. In another example, the gaming machine 100 has a side-mounted configuration in which the projection apparatus 102 is mounted generally to the side of the curved surface 104. In the side-mounted configuration, the projection apparatus 102 is positioned generally at the same height as, but not directly behind, the curved surface 104. The mirror reflector 113 is oriented such that it reflects the projected images from the side position of the projection apparatus 102. In yet another example, the gaming machine 100 has a front-mounted configuration in which the projection apparatus 102 is mounted generally in front of the curved surface 104, on the player side of the gaming machine 100.

Figure 7:
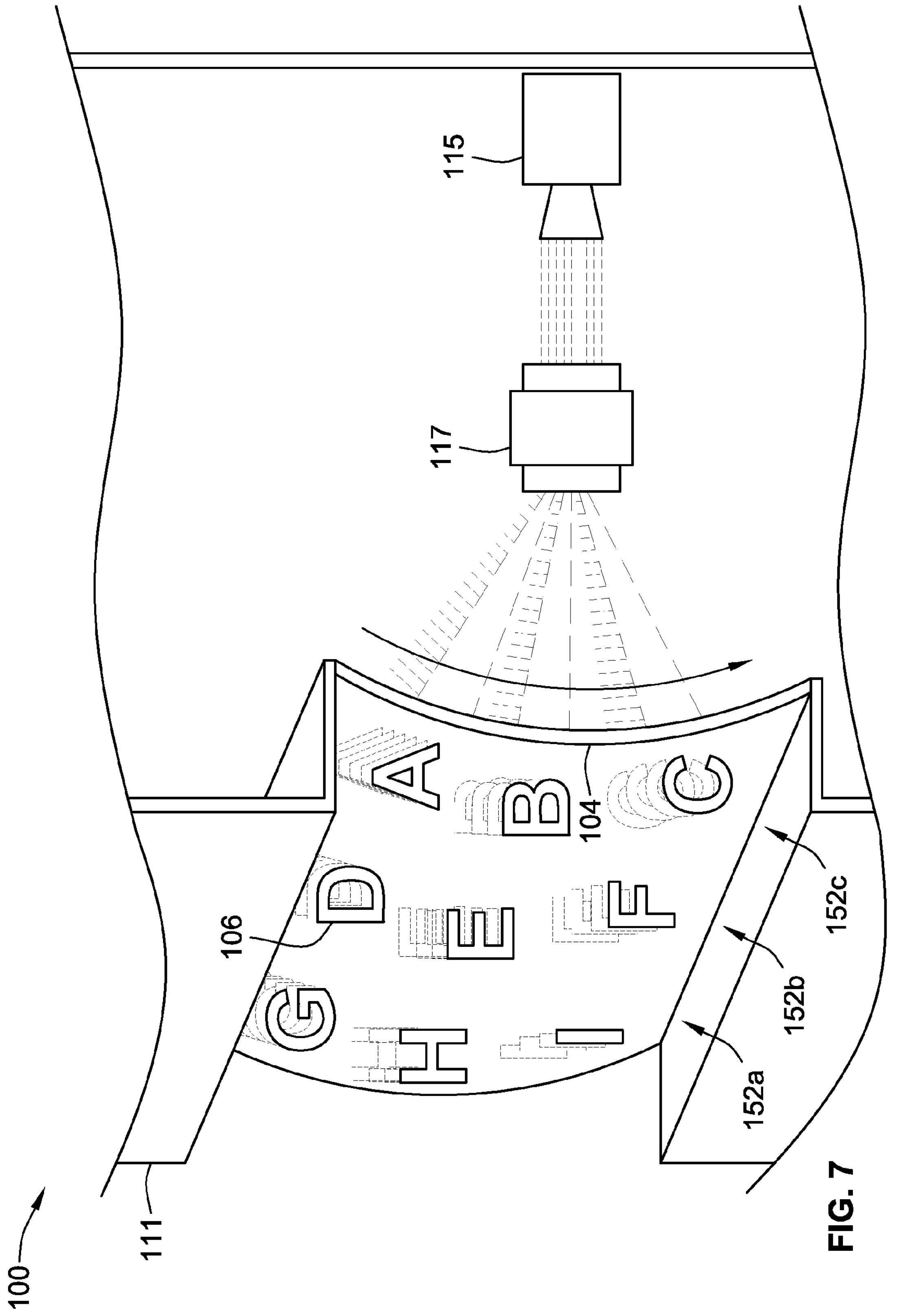
FIG. 7 is an illustrative side view of a projection apparatus with a K-mirror system.

Referring to FIG. 7, the gaming machine 100 includes a non-rotatable (or stationary) projector 115 that projects images to image rotation optics, such as a rotatable K-mirror 117. The rotatable K-mirror 117 manipulates the images through a series of internal mirrors, as is known in the art, and imparts (as the rotatable K-mirror 117 is being rotated) a desired visual effect to the rotating images. In one type of K-mirror system, the transmitted images are images inverted at 180° orientation relative to the received images. Additional details regarding exemplary K-mirror systems are provided in U.S. Pat. No. 5,296,972, titled "Non-Polarizing Image rotation Apparatus And Method" and issued on Mar. 22, 1994, and U.S. Pat. No. 4,948,228, titled "Optical Image Rotators" and issued on Aug. 14, 1990, each of which is incorporated herein in its entirety. Thus, in this embodiment the rotation of the symbols 106 on the curved surface 104 is achieved by rotating the rotatable K-mirror 117, while the curved surface 104 and the non-rotatable projector 115 remain fixed. The rotatable K-mirror 117 can be mounted to the support structure 108 for achieving the desired rotation of the rotatable K-mirror 117.

The curved surface 104 can include one or more curved layers. The curved layers can have a radius of curvature that is generally similar (if not identical) to the radius o curvature of a mechanical reel used within a mechanical-reel style of gaming machine (e.g., four inches to seven inches). The layers can include transparent layers, semi-transparent layers, or non-transparent layers. In a back-mounted configuration (such as illustrated in FIG. 4A), the layers are typically transparent. In a front-mounted configuration, the layers are typically non-transparent, e.g., textile-backed projection surface.

Optionally, the curved surface 104 can be a single curved surface for displaying all reels of a plurality of reels, or a plurality of curved surfaces for displaying a respective reel of the plurality of reels. For example, the curved surface 104 can be a single curved surface on which the three reels 152*a*-152*c* are displayed. In another example, the curved surface 104 can include a first curved surface for displaying the left reel 152*a*, a second curved surface for displaying the middle reel 152*a*, and a third curved surface for displaying the right reel 152*c*.

Figure 8:
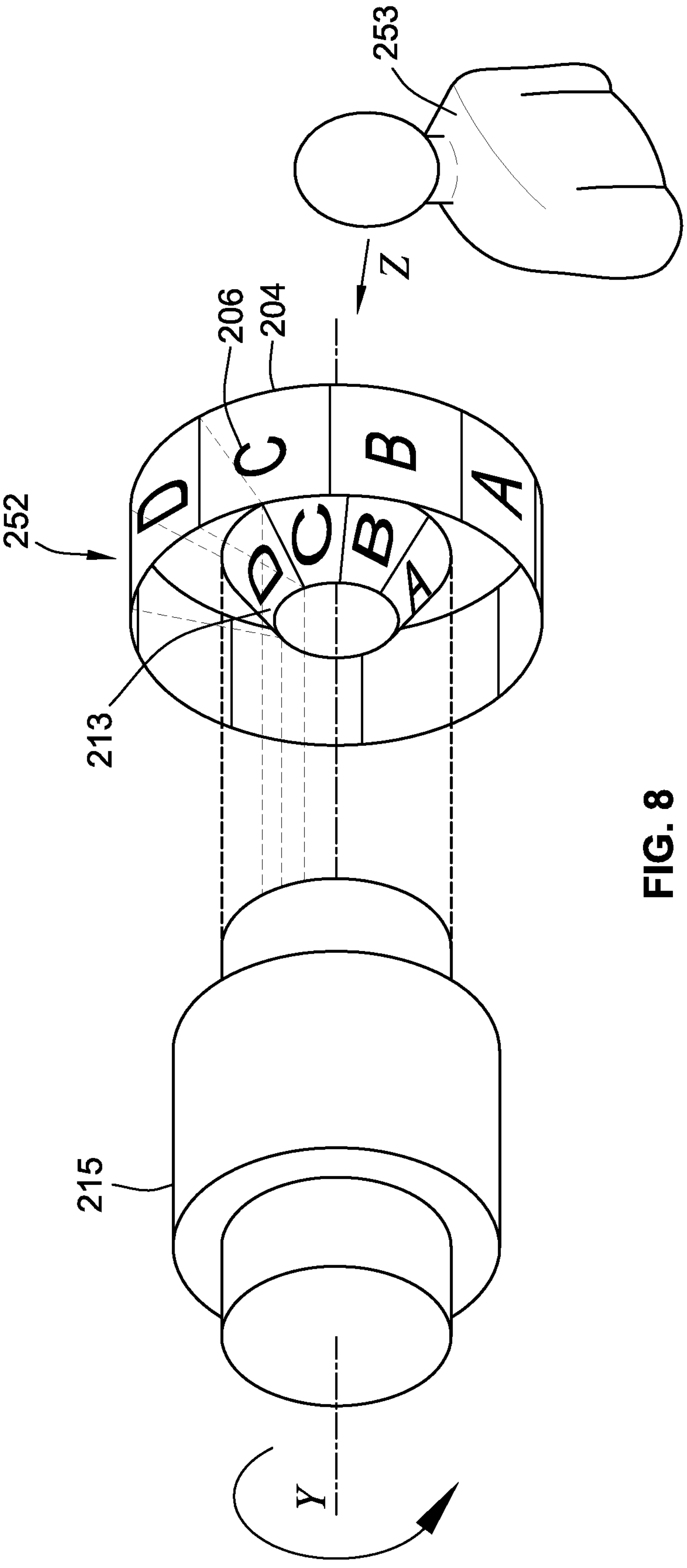
FIG. 8 is an illustrative perspective view of a projection apparatus including a conical mirror.

Referring to FIG. 8, a projection configuration includes a rotatable projector 215 that projects images onto a conical mirror 213. The conical mirror 213 is located within a curved display 204 and reflects the images received from the rotatable projector 215 onto the surface of the curved display 204 as symbols 206. The symbols 206 are displayed on the curved surface 204 in the form of a reel 252. As the projector 215 is rotated along a spinning axis Y, the symbols 206 rotate to simulate a spinning motion of the reel 252 to a viewer 253. A viewer direction Z is perpendicular to the spinning axis Y. The projection configuration is adapted for use in the gaming machine 100 and the player is located in front of the gaming machine 100, in a player position.

Figure 9:
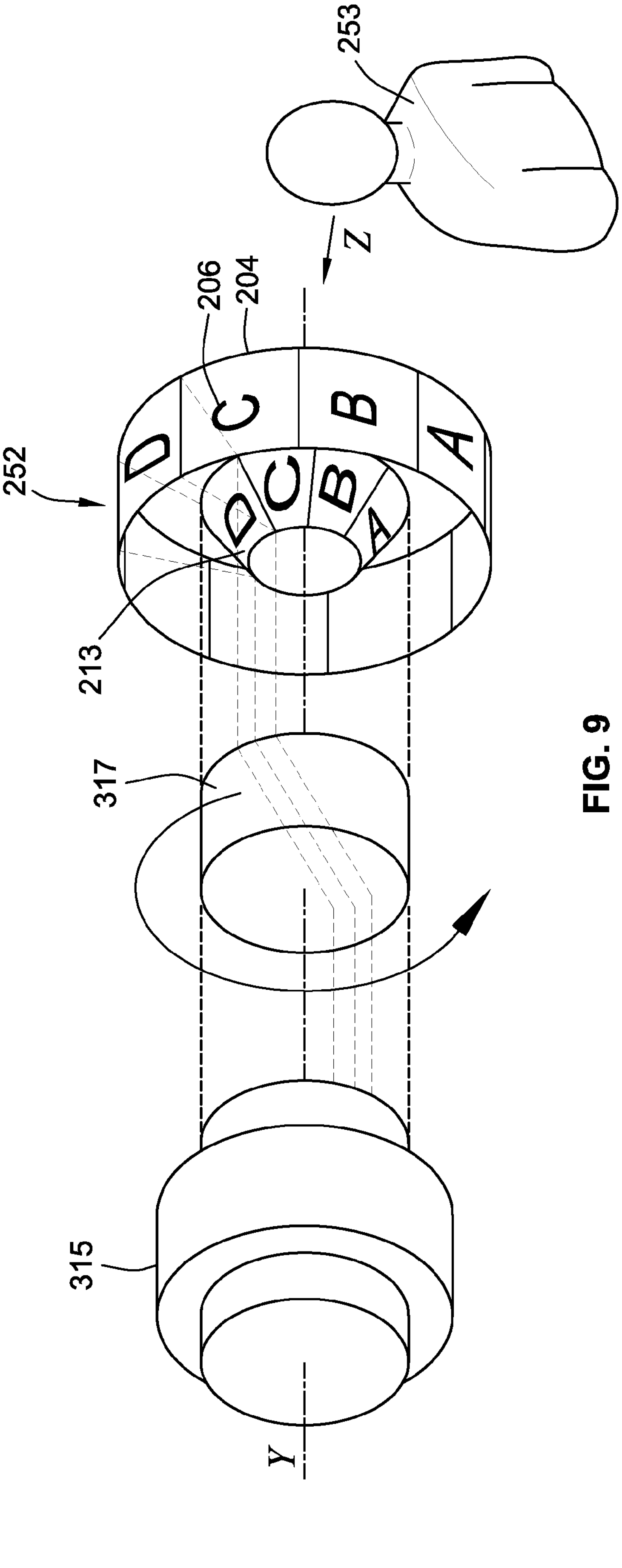
FIG. 9 is an illustrative perspective view of a projection apparatus with a K-mirror system and a conical mirror.

Referring to FIG. 9, an alternative configuration to the configuration of FIG. 8 is directed to a non-rotatable projector 315 that projects images to a rotatable K-mirror 317. The rotatable K-mirror 317 manipulates the images through a series of internal mirrors, as is known in the art, and imparts (as the rotatable K-mirror 317) a desired visual effect onto the curved display 204. Thus, the rotatable K-mirror 317 projects the symbols 206 onto the curved display 204 and simulates the spinning motion of the reel 252 to the viewer 253. Optionally, the curved display 204 can be similar to the curved display 104 of FIGS. 4A-7.

Figure 10:
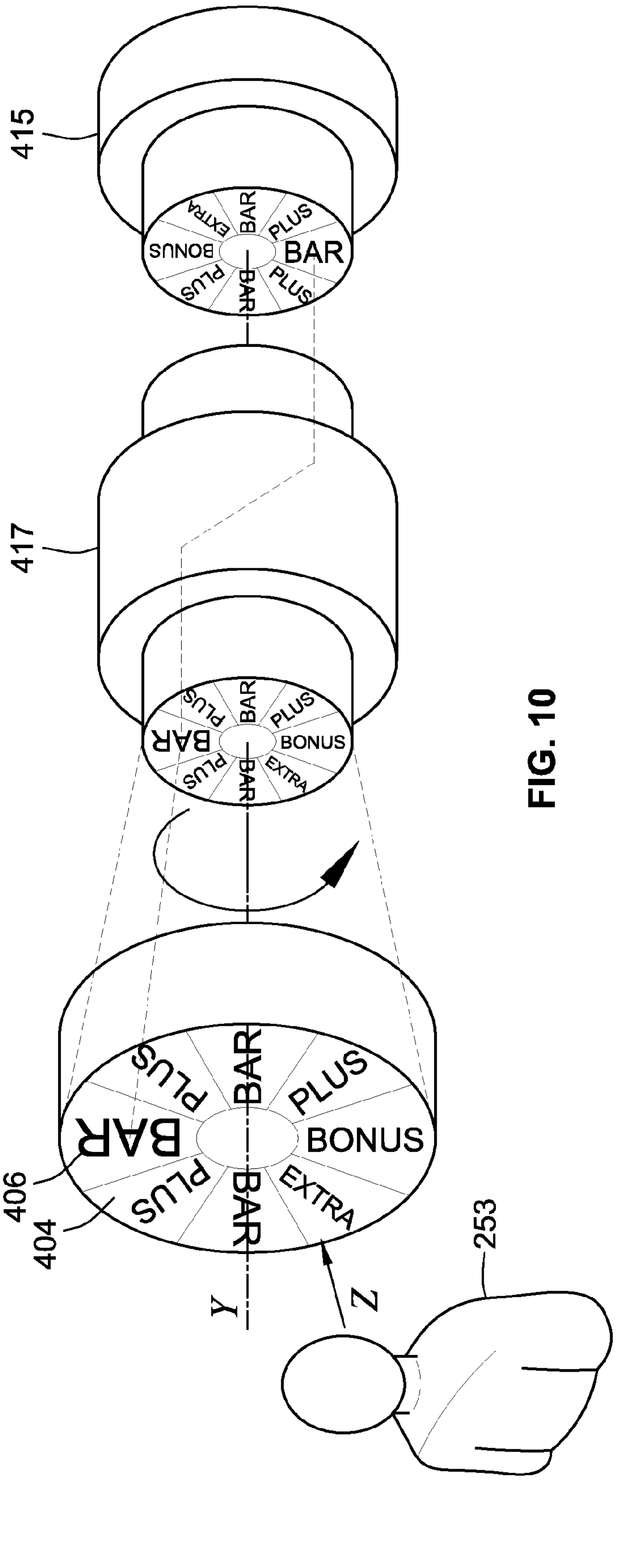
FIG. 10 is an illustrative perspective view of a projection apparatus with a K-mirror system configured to display a wheel-type projection.

Referring to FIG. 10, in an alternative example a fixed projector 415 transmits images to a rotatable optical device 417. The rotatable device 417 manipulates the images and projects them onto a curved display 404 in the form of symbols 406. This configuration is also adapted for use in the gaming machine 100. One difference between the configuration of FIG. 10 and the previous example of FIGS. 8 and 9 is that the spinning axis Y is oriented in a different direction relative to the viewer direction Z. Specifically, in contrast to the viewer direction Z being perpendicular to the spinning axis Y (as illustrated in FIGS. 8 and 9), the viewer direction Z in this alternative example is in the same direction as the spinning axis Y, i.e. aligned with the spinning axis Y.

Each of these embodiments and obvious variations thereof is contemplated as falling within the spirit and scope of the claimed invention, which is set forth in the following claims.

What is claimed is:

1. A gaming machine for playing a wagering game, comprising:

a cabinet having a display area with at least one non-rotating curved surface facing a player area in front of the gaming machine;

a non-rotating projection apparatus configured to project images of symbols; and an image rotating device located within the cabinet between the non-rotating curved surface and the non-rotating projection apparatus, the image rotating device configured to receive the images of the symbols from the non-rotating projection apparatus and to project rotated images of the symbols onto the non-rotating curved surface such that the symbols appear to respectively and rotatably move and then stop along the non-rotating curved surface, the symbols indicating, in a stopped position, a randomly selected outcome of the wagering game.

2. The gaming machine of claim 1, wherein the image rotating device is a rotatable mirror.

3. The gaming machine of claim 2, wherein the rotatable mirror is a K-mirror rotator.

4. The gaming machine of claim 1, further comprising a conical mirror configured to reflect the rotated images of the symbols onto the non-rotating curved surface.

5. The gaming machine of claim 1, wherein the at least one non-rotating curved surface includes a plurality of curved surfaces, and wherein the image rotating device is configured to project the rotated images of the symbols onto the plurality of curved surfaces.

6. The gaming machine of claim 4, wherein the conical mirror is located adjacent the non-rotating curved surface.

7. The gaming machine of claim 1, wherein the images of the symbols are displayed in the form of a plurality of reels.

8. The gaming machine of claim 6, wherein the non-rotating projection apparatus, the image rotating device, and the conical mirror are aligned along a central axis.

9. The gaming machine of claim 1, wherein the image rotating device is mounted in a back-mounted configuration.

10. A gaming machine for playing a wagering game, comprising:

a cabinet for housing input devices;

at least one non-rotating curved surface;

a stationary projection apparatus configured to project non-rotating images of symbols; and an image rotating device located within the cabinet between the non-rotating curved surface and the stationary projection apparatus, the image rotating device being configured to rotate and project the non-rotating images of the symbols onto the non-rotating curved surface to indicate a randomly selected outcome of the wagering game.

11. The gaming machine of claim 10, wherein the image rotating device is a rotatable mirror.

12. The gaming machine of claim 11, wherein the rotatable mirror is a K-mirror rotator.

13. The gaming machine of claim 10, further comprising a conical mirror configured to reflect the rotated images of the symbols onto the non-rotating curved surface.

14. The gaming machine of claim 10, wherein the at least one non-rotating curved surface includes a plurality of curved surfaces, and wherein the image rotating device is configured to project the non-rotating images of the symbols onto the plurality of curved surfaces.

15. The gaming machine of claim 13, wherein the conical mirror is located adjacent the non-rotating curved surface.

16. The gaming machine of claim 10, wherein the rotating images and the non-rotating images of the symbols are displayed in the form of a plurality of reels.

17. A gaming system configured to conduct a wagering game, the gaming system comprising:

one or more input devices;

one or more display devices, at least one of the one or more display devices including at least one non-rotating curved surface;

one or more processors;

one or more memory devices storing instructions that, when executed by at least one of the one or more processors, cause the gaming system to:

receive, via at least one of the one or more input devices, an input indicative of a wager, and randomly select an outcome from a plurality of outcomes;

a non-rotating projection apparatus configured to project non-rotating images of symbols; and an image rotating device configured to receive the non-rotating images of the symbols from the non-rotating projection apparatus and to project rotated images of the symbols onto the non-rotating curved surface such that the symbols appear to respectively move and then stop along the non-rotating curved surface, the symbols indicating, in a stopped position, the randomly selected outcome.

18. The gaming system of claim 17, wherein the image rotating device a rotatable mirror.

19. The gaming system of claim 17, further comprising a conical mirror configured to reflect the rotated images of the symbols onto the non-rotating curved surface.

20. The gaming system of claim 17, wherein the at least one non-rotating curved surface includes a plurality of curved surfaces, and wherein the image rotating device is configured to project the rotated images of the symbols onto the plurality of curved surfaces.

* * * * *